J. SOWERBY & H. DECK.
GATES.
No. 183,983.                Patented Oct. 31. 1876.
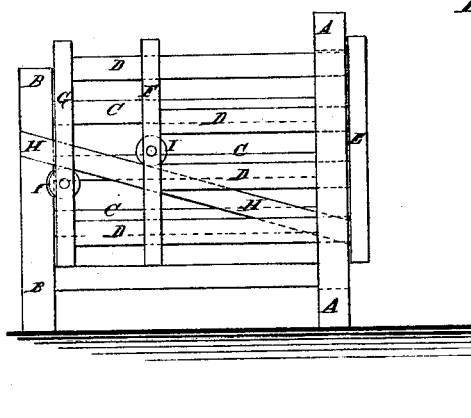
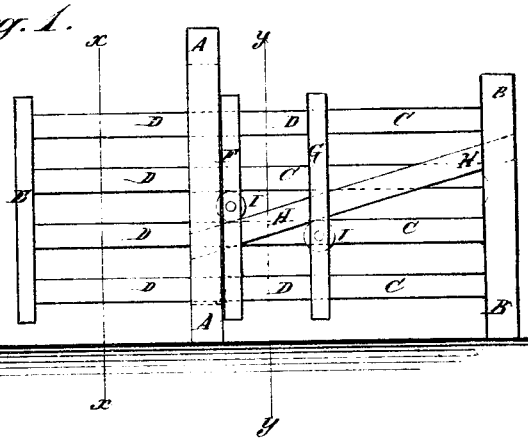
Fig. 1.
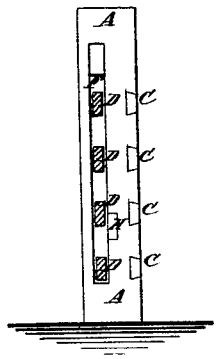
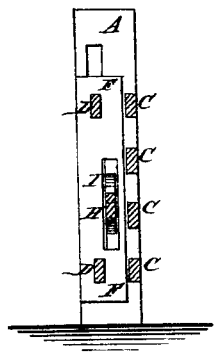
Fig. 2.   Fig. 3.
WITNESSES:
H. Rydquist
John Goethals
INVENTOR:
J. Sowerby
H. Deck
BY
Munn &
ATTORNEYS.

UNITED STATES PATENT OFFICE.

JONATHAN SOWERBY AND HENRY DECK, OF ROCKFORD, MICHIGAN.

IMPROVEMENT IN GATES.

Specification forming part of Letters Patent No. 183,983, dated October 31, 1876; application filed September 22, 1876.

*To all whom it may concern:*

Be it known that we, JONATHAN SOWERBY and HENRY DECK, of Rockford, Kent county, Michigan, have invented a new and Improved Gate, of which the following is a specification:

Figure 1 is a side view of a double gate, illustrating our invention, part being shown open and part closed. Fig. 2 is a vertical cross-section of the same, taken through the line $x$ $x$, Fig. 1; and Fig. 3 is a vertical cross-section of the same, taken through line $y$ $y$, Fig. 1.

Similar letters of reference indicate corresponding parts.

The object of this invention is to furnish an improved gate, which shall be strong and durable, simple in construction, easily opened, and self-closing, and which may be made single or double, as may be desired.

The invention consists in the combination of the inclined bar, the rollers, and the gate, constructed as described, with each other, and with the slotted gate-post and the fence-post, as hereinafter set forth.

A represents the gate-post. B represents the first post of a fence, in line with the gateway; and C represents the first panel of the fence, which is attached to the posts A B. The gate is formed of four or more horizontal bars, D, and three cross-bars, E F G. The horizontal bars D pass through a slot in the gate-post A, and to their forward ends is attached the front cross-bar E. To the horizontal bars D, in the rear of the post A, and at a distance from the cross-bar E equal to the space through which the gate must move in being opened and closed, is attached the intermediate cross-bar F. The upper and lower horizontal bars D of the gate extend in the rear of the cross-bar F, and to their ends is attached the rear cross-bar G. The cross bars F G are slotted to receive the inclined bar H, the lower end of which is attached to the gate-post A, and its upper end is attached to the fence-post B. In the slot of the cross-bar F, above the inclined bar H, and in the slot of the cross-bar G, below the inclined bar H, are pivoted two rollers, I, which roll along the edges of said inclined bar H as the gate is opened and closed.

By this construction, as the gate is pushed back or open, the wheels I roll up the inclined bar H, and at the same time keep the gate in horizontal position. As the gate is released, its weight causes the wheels I to roll down the inclined bar H, and the gate closes itself.

The gate may be made single or double, as may be desired, or as the width of the gateway may require.

Having thus described our invention, we claim as new and desire to secure by Letters Patent—

The combination of the sliding gate-panel having the slotted cross-bars F G and rollers I, with the posts A B and fixed inclined track or rail H, as and for the purpose set forth.

JONATHAN SOWERBY.
HENRY DECK.

Witnesses:
DAVID C. FLETCHER,
NOAH HELSEL.